United States Patent
Song et al.

(10) Patent No.: US 10,325,002 B2
(45) Date of Patent: Jun. 18, 2019

(54) WEB SERVICE FRAMEWORK

(71) Applicant: SAP SE, Walldorf (DE)

(72) Inventors: Yihan Song, Shanghai (CN); Shenghai Xu, Shanghai (CN); Qin Qian, Shanghai (CN); Hongyue Xiao, Shanghai (CN)

(73) Assignee: SAP SE, Walldorf (DE)

( * ) Notice: Subject to any disclaimer, the term of this patent is extended or adjusted under 35 U.S.C. 154(b) by 386 days.

(21) Appl. No.: 14/499,269

(22) Filed: Sep. 29, 2014

(65) Prior Publication Data

US 2016/0092590 A1 Mar. 31, 2016

(51) Int. Cl.
| | |
|---|---|
| *G06F 17/00* | (2019.01) |
| *G06F 17/30* | (2006.01) |
| *G06F 16/958* | (2019.01) |
| *G06F 16/957* | (2019.01) |

(52) U.S. Cl.
CPC ........ *G06F 16/986* (2019.01); *G06F 16/9577* (2019.01)

(58) Field of Classification Search
CPC . G06F 17/248; G06F 8/20; G06F 8/36; G06F 8/60; G06F 8/30
See application file for complete search history.

(56) References Cited

U.S. PATENT DOCUMENTS

| | | | | |
|---|---|---|---|---|
| 5,966,535 A * | 10/1999 | Benedikt | ................. | G06F 8/436 707/999.01 |
| 6,115,690 A | 9/2000 | Wong | | |
| 6,543,008 B1 * | 4/2003 | Ninomiya | ................. | G06F 8/60 710/15 |
| 6,640,249 B1 | 10/2003 | Bowman-Amuah | | |
| 7,305,653 B2 * | 12/2007 | Davis | ........................ | G06F 8/36 717/100 |
| 7,886,222 B2 | 2/2011 | Bagare et al. | | |
| 8,137,112 B2 | 3/2012 | Woolf et al. | | |
| 8,255,888 B2 | 8/2012 | Jesse et al. | | |
| 8,438,295 B2 | 5/2013 | Shukla et al. | | |
| 8,490,052 B2 | 7/2013 | Shukla et al. | | |
| 8,533,666 B2 | 9/2013 | Shukla et al. | | |
| 8,725,522 B2 | 5/2014 | Balko | | |
| 2001/0013072 A1 * | 8/2001 | Okada | ..................... | G06F 9/542 719/315 |
| 2001/0037490 A1 * | 11/2001 | Chiang | ..................... | G06F 8/30 717/106 |
| 2004/0046793 A1 * | 3/2004 | Tanaka | ..................... | G06F 8/30 715/763 |
| 2007/0192818 A1 * | 8/2007 | Bourges-Sevenier | ....................... | G06F 9/45504 725/132 |
| 2008/0178256 A1 * | 7/2008 | Perrone | .................. | G06F 9/468 726/1 |

(Continued)

*Primary Examiner* — Ariel Mercado
(74) *Attorney, Agent, or Firm* — Klarquist Sparkman, LLP

(57) ABSTRACT

Representative implementations provide devices and techniques for automatically generating a skeleton of at least a portion of a web service application. The skeleton comprises a framework that may be modified as needed for a desired use, such as for a relational database backed application, for example. In one aspect, the framework includes a versatile model to support different validation methods and varied customization. Filter support allows a user to perform actions on and/or define rules for inputs. In another aspect, the skeleton is automatically activated in an in-memory database repository.

20 Claims, 10 Drawing Sheets

(56) References Cited

U.S. PATENT DOCUMENTS

| | | |
|---|---|---|
| 2008/0189679 A1 | 8/2008 | Rodriguez et al. |
| 2008/0201338 A1* | 8/2008 | Castro ................ G06F 17/3056 |
| 2009/0125892 A1* | 5/2009 | Crewdson ................ G06F 8/10 |
| | | 717/136 |
| 2010/0229183 A1* | 9/2010 | Bae ........................ G06F 9/465 |
| | | 719/315 |
| 2012/0226737 A1 | 9/2012 | Rajaraman et al. |
| 2012/0324069 A1 | 12/2012 | Nori et al. |
| 2013/0046894 A1 | 2/2013 | Said et al. |
| 2013/0326079 A1 | 12/2013 | Seifert et al. |
| 2014/0047413 A1 | 2/2014 | Sheive et al. |

* cited by examiner

401

```
"rewrite_rules" : [
    {
        "source": "/(\\w+)\\.(json|xml|html|txt)([\\w\\{\\}\\/]+)?\\??(.+)?",
        "target": "/$1.xsjs?format=$2&raw=$3&$4"
    }
]
```

403

So considering an inbound POST request with URL:

http://host:port/sap/trp/xs/sample.json/1234567/purchase

After applying the rule, it becomes:

http://host:port/sap/trp/xs/sample.xsjs?$format=json&raw=/1234567/purchase
And then after parsing the framework recognizes that the 1234567 is the resource ID and purchase is the action.

| HTTP Method | Scope | Operation | Method | Response |
|---|---|---|---|---|
| POST | Collection | Create | create | 201 Created |
| PUT | Member | Update | update | 204 No Content |
| DEL | Member | Delete | destroy | 204 No Content |
| GET | Member | Get by PK | show | 200 OK |
| GET | Collection | Get all | index | 200 OK |

503

```
entity.setRoutes([{method: $.net.http.POST, scope: "collection", action:
"dummy"}, {method: $.net.http.POST, scope: "member", action:
"purchase", response: $.net.http.OK}]);
```

FIG. 5

```
function Sample() { this.init = function(obj) {
        obj.status = obj.status || "Normal";
    };

}

Sample.prototype = { validates : [
        { field: "id", presence: true, on: "update"},
        { field: "name", format: {expr: /[a-zA-Z]/}, message: "only
allow letters", args: ["{name}"] },
        { field: "size", inclusion: {scope: ["small", "big"]},
message: "INVALID_SIZE"},
        { field: "lastName", length: { minimum: 2}},
        { field: "firstName", length: { maximum: 10}},
        { field: "middleName", length: { within: [2, 6]}},
        { field: "surname", length: { is: 8}},
        { field: "credit/points", numericality: true},
        { field: "clubId", uniqueness: {sql: 'SELECT 1 FROM
"sap.tam.sample.db::t_sample" WHERE ID = ?', message: "already been
taken"}},
        { field: "cardNumber", validateWith: function(obj) {
                return obj.payment && obj.cardNumber && typeof
obj.cardNumber === "string" && obj.cardNumber.length === 10;
            }
        },
    ], afterInitialize: ["init"]

```
{
  "name": "sample",
  "stubs": [
    {"name": "index" },
    {"name": "show" },
    {"name": "destroy" },
    {"name": "update" },
    {"name": "create"},
    {"name": "dummy", "route": {"method": "POST", "scope": "collection"}, "filter": true},
    {"name": "purchase", "route": {"method": "POST", "scope": "member"}}
  ],
  "packagePath": "sap.tam.sample",
  "model": "/sap/tam/sample/model/Sample.xsjslib"
}
```

FIG. 7

```
var lib = $.import("xslib/rest.xsjslib");
var entity = new lib.SimpleRest({
    name: "Sample",
    desc: "Simple REST Framework Sample
Service",
    model: new $.import("models/
sample.xsjslib").Sample()
});

entity.index = function(params) {
    return [{a: 1}, {a: 2}, {a: 3}];
};

entity.show = function(params) {
    return {
        id: params.id
    };
};

entity.create = function(params) {
    return params;
};

entity.update = function(params) {
    $.trace.debug(JSON.stringify(params));
};

entity.destroy = function(params) {
    // do something but without return value
    $.trace.debug(JSON.stringify(params));
};
```

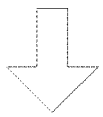

FIG. 8

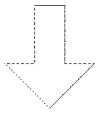

```
entity.dummy = function(params) {
    return {
        dummy: "params: " +
JSON.stringify(params)
    };
};

entity.purchase = function(params) {
    return {
        purchase: "params: " +
JSON.stringify(params)
    };
};

entity.setFilters([{
    filter: function(params) {
        $.trace.debug("dummy filter
invoked!");
        return true;
    },
    only: ["dummy"]
}]);

entity.setRoutes([{
    method: $.net.http.POST,
    scope: "collection",
    action: "dummy"
}, {
    method: $.net.http.POST,
    scope: "member",
    action: "purchase"
}]);

entity.handle();
```

FIG. 9

WEB SERVICE FRAMEWORK

BACKGROUND

Developing a software product can be a long, labor-intensive process, typically involving contributions from multiple developers. A developer tasked with building a native web service type application, such as a relational database backed web service, for example, or else a portion of an existing application, often has to build the application/portion from scratch. In many cases, the developer manually writes complicated logic intended to handle anticipated requests that are to come from the user interface (UI) side of the application. As part of the development process, the developer often attempts to manually retain the logic flow of the various portions of the code, as well as manually validate the potential inputs.

Without a unified message handling mechanism, the developer may be left to manually set the response body as well as determine the content-types of the responses (and HTTP response code as well) to UI-based inputs. However, the user interface side of the application may encounter issues handling responses if the response body varies (including between different developers' work). Further, developer efficiency and productivity may not be optimal and the finished product may not be optimal either if each developer is left to individual preferences.

SUMMARY

Devices and techniques for automatically generating a skeleton of at least a portion of a web service application is provided herein. In accordance with one aspect, a service call request is received. The request may be transformed to conform to a customizable framework. The customizable framework may then be imported, and a skeleton of a web service application component may be automatically generated based on the customizable framework.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 4 illustrates an example rule rewrite technique that may be used to transform an inbound request of one format to another format. The example rule and an example result are shown in the illustration.

FIG. 5 illustrates an example route table and a sample code for registering customized actions to a route table.

FIG. 6 illustrates an example code segment for defining a data model of inbound input.

FIG. 7 illustrates an example payload for the code segment of FIG. 6.

FIGS. 8 and 9 illustrate example code of a portion of a skeleton for a web service application component.

DETAILED DESCRIPTION

Figure 1:
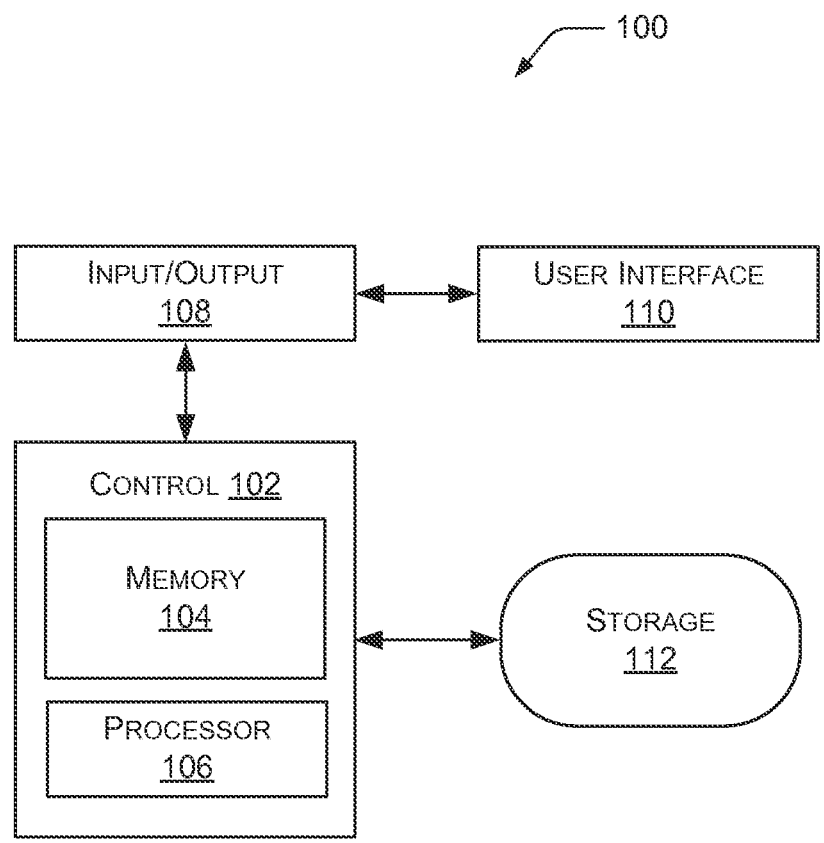
FIG. 1 is a block diagram of an example system, wherein the techniques and devices discussed herein may be implemented.

Representative implementations provide devices and techniques for automatically generating a skeleton of at least a portion of a web service application. The skeleton comprises a framework that may be modified as needed for a desired use, such as for a relational database backed application, for example. In one aspect, the framework includes a versatile model to support different validation methods and varied customization. Filter support allows a user to perform actions on and/or define rules for inputs. In another aspect, the skeleton comprising the framework may be automatically activated in an in-memory database repository.

Web services are methods of communication between two or more electronic devices over a network. Specifically, a web service may be described as a system comprising hardware and software that is designed to support interoperable machine-to-machine interaction over a network. A web service can have an interface described in machine-processable format, such as Web Services Description Language (WSDL).

Systems can interact with a web service in a manner prescribed by its description, for instance, using SOAP messages. Two common classes of web services may apply to the techniques and systems described herein: Representational State Transfer (REST)-compliant web services, in which the primary purpose of the service is to manipulate XML representations of web resources using a uniform set of "stateless" operations; and arbitrary web services, in which the service may expose an arbitrary set of operations. REST-based web services do not require XML, SOAP, or WSDL service-API definitions. Instead, REST-based web services can constrain their interfaces to a small set of well-known, standard operations (i.e., GET, POST, PUT, and DELETE for use with HTTP interactions). REST-based web services interact with stateful resources as opposed to stateful messages and operations. Other classes of web services may also be used with the systems and techniques described herein.

A developer tasked with building a native relational database backed web service type application, or a portion of the application, generally has to build the application/portion from scratch. In many cases, the developer manually writes complicated logic intended to handle requests coming from the user interface side of the application. As part of the process, the developer needs to retain the logic flow throughout as well as manually validate the potential inputs.

In various implementations, the disclosed techniques and devices automatically generate the skeleton of the web service application component, and automatically activate the skeleton of the web service application component in a relational database repository. This relieves the developer from manually producing the framework or the skeleton, and provides uniformity of the basic elements of the application. The framework includes different validation methods to ensure valid fields and uniform forms and types.

In an implementation, the disclosed techniques and devices include a scaffolding service to assist in automatically generating the skeleton of the web service application.

In some examples, the scaffolding service also automatically activates the skeleton of the web service application component in an in-memory repository.

In further implementations, the framework includes various customizing methods, giving the developer a stable foundation that is customizable for a desired application. Filter support may be included to allow the developer to perform certain actions on specified response methods, such as providing authorizations, permissions, and the like (e.g., the user having the correct privileges, membership, sufficient funds, etc.).

The discussion herein is intended to illustrate example components and techniques which may be utilized, but the examples described are not intended to be limiting. In various implementations, fewer, alternate, or additional components may be included to perform various portions of described techniques while remaining within the scope of the disclosure. For example, the techniques and systems described herein may be applied in various computing environments, networks, other forms and types of computing models, and the like.

It will be apparent to one skilled in the art that the present frameworks and methods described herein may be practiced without the specific exemplary details given in the disclosure as examples. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Advantageous features of the disclosed techniques, devices and systems include, but are not limited to: 1) a unified solution providing service handling/responding, skeleton service generation, and customizing/validating model for more efficient production of a consistent product; 2) a reliable framework that may be used in a development process to improve developer's productivity and increase efficiency; 3) easy for a user to understand and use, the techniques, devices and systems and reduce a developer's coding by providing a scaffold service as well as a framework; 4) the techniques, devices and systems may be provided along with various software solutions to users for customization purposes to fulfill various application needs as well as to developers for further development of software products and add-ons. Other advantages will also be apparent to persons having skill in the art.

FIG. 1 shows an example of a system 100 wherein the techniques and devices discussed herein may be implemented. In the example, the system 100 uses a control module 102, for example, to perform computational, analytical, and control functions for the system 100. As shown in FIG. 1, the control module 102 may include a memory 104 and one or more processors 106, as are described further below. In various embodiments, the system 100 includes an input/output (I/O) module 108, a user interface (UI) 110, and may also include a storage component 112.

Figure 2:
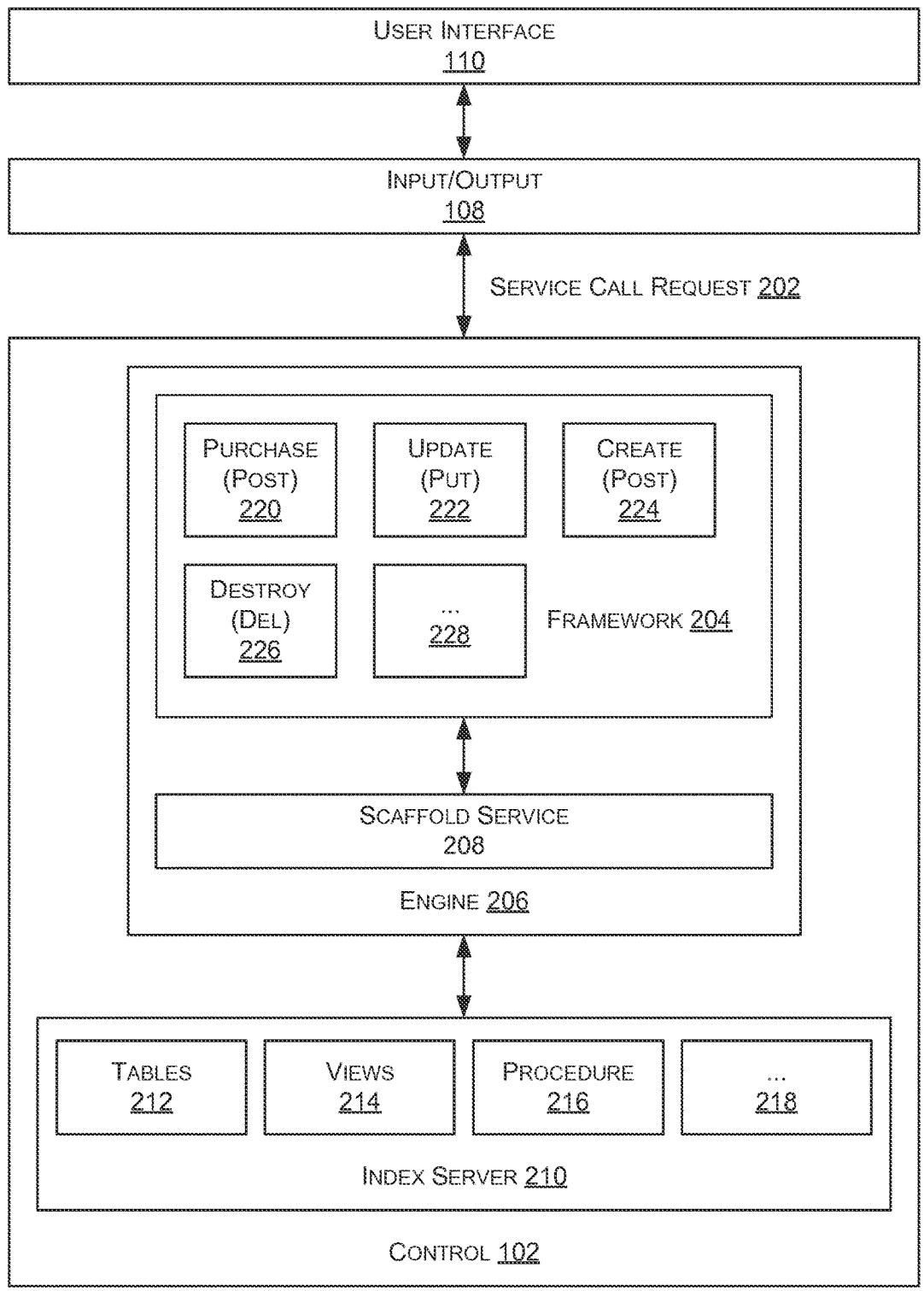
FIG. 2 is a block diagram of an example architecture for skeleton generation.

Referring to FIGS. 1 and 2, in an implementation, the control module 102 is arranged to receive a service call request 202 from the UI 110, via the I/O module 108. In the implementation, the control module 102, using the processor 106 and the memory 104 (and may also be using the storage 112), is arranged to transform the request 202 to conform to a customizable framework 204. In other words, the control module 102 rewrites the request 202 into a form that is understood by the framework 204, as is discussed further below.

In various implementations, the framework 204 is imported into the engine 206 and/or the memory 104, to be used as a template for generating a skeleton of the web service application component under construction. For example, in the implementation, the control module 102 is arranged to automatically generate the skeleton of the web service application component based on the operations, validations, filters, etc., of the framework 204. This frees the developer from having to manually code many of the overhead portions of the web service application component, and assures consistency among multiple components of the web service application that are developed using the framework 204.

Referring to FIG. 2, in an implementation, the skeleton of the web service application component is generated using a scaffold service 208. For example, the scaffold service 208 uses the framework 204 to automatically generate the web service application component, based on the properties, parameters, etc., of the framework 204 and based on the service call request 202. In an implementation, additional frameworks may be imported into the engine 206, and used with the framework 204 to generate the web service application component. In an implementation, the framework 204 (as well as any additional frameworks) may be customized by a user to accommodate a desired application of the web service component.

In various implementations, the scaffold service 208 is arranged to automatically activate the skeleton of the web service application component. For example, in one implementation, the scaffold service 208 is arranged to automatically activate the skeleton of the web service application component in an in-memory database repository. In one implementation, the scaffold service 208 is generated using the customizable framework 204. In one example, the scaffold service 208 is automatically generated by the customizable framework 204.

In an implementation, the framework 204 is arranged to support different predetermined and/or user-defined method calls, validation methods, and filter rules. For example, the framework 204 is arranged to handle various requests (service call requests 202), and invoke a corresponding operation (e.g., regarding a table 212, a view 214, a stored procedure 216, a query, or the like, from index server 210). In an example, a custom operation 218 may also be available for invocation by the framework 204. For example, in one implementation, the framework 204 is arranged to handle Hypertext Transfer Protocol (HTTP) requests which follow the REST (Representational State Transfer) style, for instance, and to invoke corresponding database operations. In the example, the web service application comprises a REST-based relational database type web service application.

As shown in FIG. 2, the example framework 204 includes operations such as purchase 220, update 222, create 224, and destroy 226. In an example, these operations fall under the CRUD (create, read, update, and delete) standard for database operations. This is not intended to be limiting, and in other examples, the framework 204 includes operations that are applicable to other desired application types. Also as shown in FIG. 2, the framework 204 includes the ability to customize or create additional custom operations 228 as desired.

Further, in the implementation, the framework 204 is arranged to transform the request 202 to a predetermined format compatible with the framework 204, and to send a response back to the client via the I/O module 108, based on the operations invoked due to the request 202.

In an implementation, the user interface 110 is arranged to display the output (e.g., a response to the service call request 202, representation of a response object of the web service application component, etc.) to a user, as determined by the control module 102. For example, the output can be displayed via the user interface 110 of a display device (e.g., display of a mobile device, tablet, computer display screen, etc.) or the like. Further, the output may be transmitted to one or more remote locations, applications, services, and the like.

In an example, the output may include a confirmation of the operations invoked. For instance, the service request 202 may include a purchase transaction and the output may include confirmation of the purchase. In other examples, the output may include confirmation that a database object (such as a name or an address) has been updated, or that permission, authorization, license, etc., has been granted to a user. In various other implementations, the output may comprise the execution of any of various actions or processes. For example, the output can include the ordering of merchandise, the payment of a bill, the transfer of funds, or the like. In various alternate implementations, the output may comprise different messages, actions, performances, and so forth. In many cases, an indication of the output may be displayed via the user interface 110.

Figure 3:
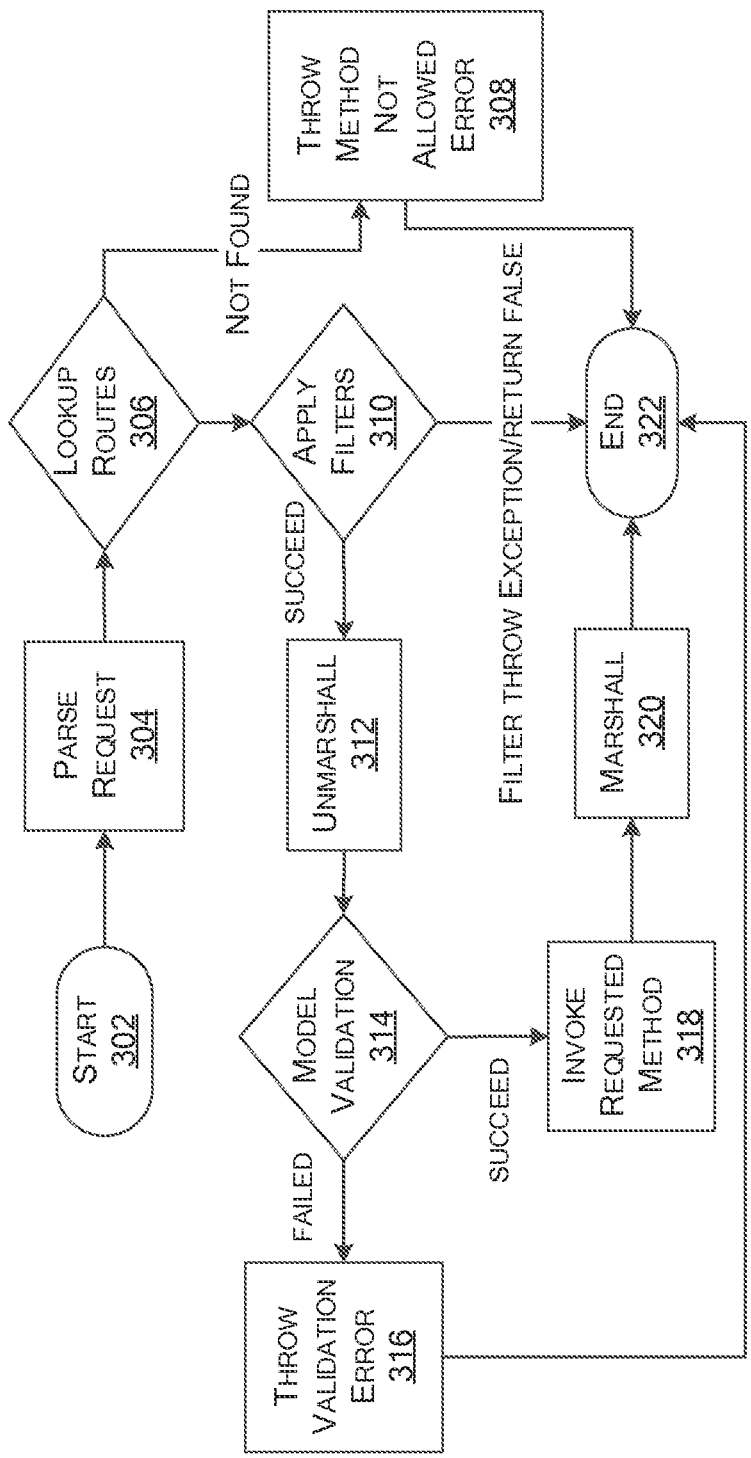
FIG. 3 is a flow diagram illustrating an example request handling technique.

FIG. 3 is a flow diagram illustrating an example request handling technique, performed by the customizable framework 204, according to an implementation. The technique starts at block 302, after receiving a request 202 from a client via the I/O module 108 and/or the UI 110. At 304, the framework 204 uses the engine 206 of the control module 102 to transform the inbound service call request 202 to a format that is compatible with the framework 204. In an implementation, the framework 204 uses one or more rewrite rules to rewrite the request 202 into a format that the framework 204 can more easily work with to determine the requested method call (e.g., POST, GET, DEL, etc.) and to determine the body and content-type (if it exists) of the request 202.

In various implementations, the framework 204 includes one or more predefined and/or user-defined rewrite rules. In one implementation, a user may compose rewrite rules for rewriting the request 202, via the UI 110. An example rewrite rule that may be used by the framework 204 to transform a request 202 is illustrated in FIG. 4 at 401. An example implementation of the rewrite rule 401 is illustrated at 403. For example, assuming the request 202 comprises a POST request, with the URL:

http://host:port/sap/trp/xs/sample.json/1234567/purchase, the request 202 is transformed to the form:

http://host:port/sap/trp/xs/
sample.xsjs?$format=json&raw=/12 34567/purchase
after application of the rule 401 shown in FIG. 4.

The transformed request 202 is automatically parsed by the framework 204 into component parts. In the case of the above example 403 in FIG. 4, the framework 204 recognizes that the sequence 1234567 is the resource ID, and that the action of the request 202 is "purchase."

In an implementation, at 306, the framework 204 looks up the request action and the corresponding response code in one or more route tables. In various implementations, the framework 204 includes one or more predefined and/or user-defined/user-customized route tables. In an implementation, predefined and user-defined route tables associated with the framework 204 are eventually merged into a single route table by the framework 204. In an example, the route tables include CRUD operations and associated responses. An example route table 501 is illustrated in FIG. 5. The "scope" of each listed method specifies whether the operation is performed on a single identified resource (i.e., "member") or whether the operation is performed on a set of resources (i.e., "collection").

Since not every application of the framework 204 may be sufficiently addressed by predefined route table logic, user-customized actions may be registered (e.g., added) to a route table. This is illustrated at 503 in FIG. 5, where the exemplary actions "dummy" and "purchase" are added.

The route table(s) is checked to see whether the inbound request 202 method call exists in the route table(s). If there is no valid route (i.e., the method call is not found in the route table(s)), then the framework throws an error, such as "MethodNotAllowedError," as shown at block 308.

At block 310, filters may be applied to the actions called in the request 202. In an implementation, a developer can define various filters on certain specified actions. For example, a filter can be added/customized to check whether the inbound request 202 of the current user has certain privileges for execution of an action or not. If the check fails, the framework 204 can throw an exception, and the corresponding action will not be triggered.

In an implementation, a built-in filter may be included in the framework 204 to check whether the request 202 format complies with the content type. If the request 202 header, for example, does not match the format, an error, such as "BadRequestError" may be raised. As shown in FIG. 3, such an error may end the process (at 322).

At block 312, the rewritten request 202 is un-marshalled by the framework 204. In an implementation, un-marshalling comprises de-serializing the rewritten request 202 as an object (e.g., a JSON object, etc.). In an implementation, when the framework 204 natively includes support of JSON, and the request 202 format is JSON, the framework 204 will automatically invoke a JSON-type parser (i.e., un-marshaller, de-serializer, etc.). In alternate implementations, the developer can extend the framework 204 support for other formats such as XML, for instance, by registering a XML un-marshalling handler. In an implementation, if there is no corresponding handler for the format type of the rewritten request 202, an error, such as "NotImplementedError" is thrown.

In an implementation, the framework 204 includes support of input validation, if validation is defined. In alternate implementations, the framework 204 comes with predefined validation and/or user-defined/user-customizable validation. At block 314, after the request 202 body is parsed to an object, the framework 204 performs validation on one or more fields of the object. In an example, the framework 204 may perform validation on nested fields in a hierarchical order.

In an implementation, the framework 204 is arranged to support various validation methods (for example, check the presentence, check the length, check the uniqueness, check the string pattern, etc.). In an implementation, the developer can create his or her own validation method. In an implementation, the validation methods can be overlaid to simplify the validation scenario.

In an implementation, an error, such as "ValidationError" will be thrown if validation fails, as shown at block 316. In one example, validations can include a customized error message and/or a customized message key (for internationalization, for example) to let the client know why the validation failed. With a powerful validation model included with the framework 204, developers are released from the otherwise heavy burden of doing validation.

At block 318, the framework 204 invokes the requested method (action), based on the object, when the object is valid (as determined by the validation). Any exception may be treated as a failed execution of the invoked method. After operations have been executed, at block 320, the framework 204 marshals (i.e., serializes) the response object to a string and sends the serialized response object (if the request 202 has any return object) to the client and assigns a predefined/user-defined HTTP response code. In an implementation, the framework 204 sets the content-type of the return object properly, that is to conform to the request 202 type. The process ends at 322.

Referring to FIGS. 6-9, an example scenario using a framework 204 is illustrated using example code shown in the figures. In the example scenario, it is assumed that there is an example web service application with standard CRUD (persistent storage functions) actions, as well as two additional methods in the route table, "dummy" and "purchase." Dummy has the scope "collection" and purchase has the scope "member." Additionally, the dummy action uses a filter.

For the example, the data model of the inbound input is initially defined. It is assumed for the purposes of this example, that the payload is JSON format. The following validation rules are given for the example scenario:
  id is mandatory only when updating a resource
  name should only contains letters, if invalid, returns back the input name value
  size should be either small or big, other value is not allowed
  lastName length should be no less than 2 letters
  firstName length should be no longer than 10 letters
  middleName length should between 2 and 6 letters
  surname length should be exactly 8 letters
  points should be digits only, since this field is a credit object
  clubId should be unique with certain scope
  cardNumber length should be 10 letters if the payment is "Credit Card"
  status should be "Normal" if not specified Validation rules may be created and/or customized by the user as desired to accommodate the chosen application of the web service. FIG. 6 illustrates an example code segment for defining the data model of the inbound input, according to the example. The JavaScript code of FIG. 6 is intended to fulfill the requirements of the above validation rules.

Using the built-in scaffold service 208, the skeleton of the web service application component is automatically generated. An example payload for the web service application component is shown in FIG. 7. The payload may be sent to the scaffold service 208 by using the "POST" HTTP method, for example. The following string represents an example of this technique:
  http://host:port/sap/tam/sample/scaffold.json The skeleton of the web service application component "sample.xsjs" is then automatically generated if there is no duplicate already. FIGS. 8 and 9 illustrate the example skeleton. Once the skeleton is generated, the desired logic of the chosen application of the web service application component can be implemented. For example, this may include invoking a stored procedure or transforming an inbound request 202 format, as described above.

Portions of the subject matter of this disclosure can be implemented as a system, method, apparatus, or article of manufacture using standard programming and/or engineering techniques to produce software, firmware, hardware or any combination thereof to control a computer or processor (such as processor 106, for example) to implement the disclosure. For example, portions of an example system 100 may be implemented using any form of computer-readable media (shown as memory 104 and storage 112 in FIG. 1, for example) that is accessible by the processor 106. Computer-readable media may include, for example, non-transitory computer storage media and communications media.

Computer-readable storage media includes volatile and nonvolatile, removable and non-removable media implemented in any method or technology for storage of information such as computer-readable instructions, data structures, program modules or other data. Memory 104 is an example of non-transitory computer-readable storage media. Storage 112, which may comprise network or cloud storage, for example, is another example of non-transitory computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may accessed by the processor 106.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, mini-computing devices, mainframe computers, as well as personal computers, hand-held computing devices, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

The techniques and devices disclosed may be implemented in a High-Performance Analytic Appliance (HANA) Extended Application Services (XS) environment, using an XS engine, to provide a reusable RESTful framework 204. The framework 204 can be natively written by XSJS, which runs on the XS Engine. The built-in framework 204 is then implemented with Standard RESTful handling and responding style. The techniques and devices disclosed may also be implemented in other environments, using other engines to provide a framework 204 that is implemented with RESTful or other types of handling and responding styles. In an implementation, the techniques and devices are implemented with a pluggable (de)serializing interface, for further enhancement to support more formats. In any case, the framework 204 can be customized (as described) according to different scenarios to fulfill different and various web service needs.

Figure 10:
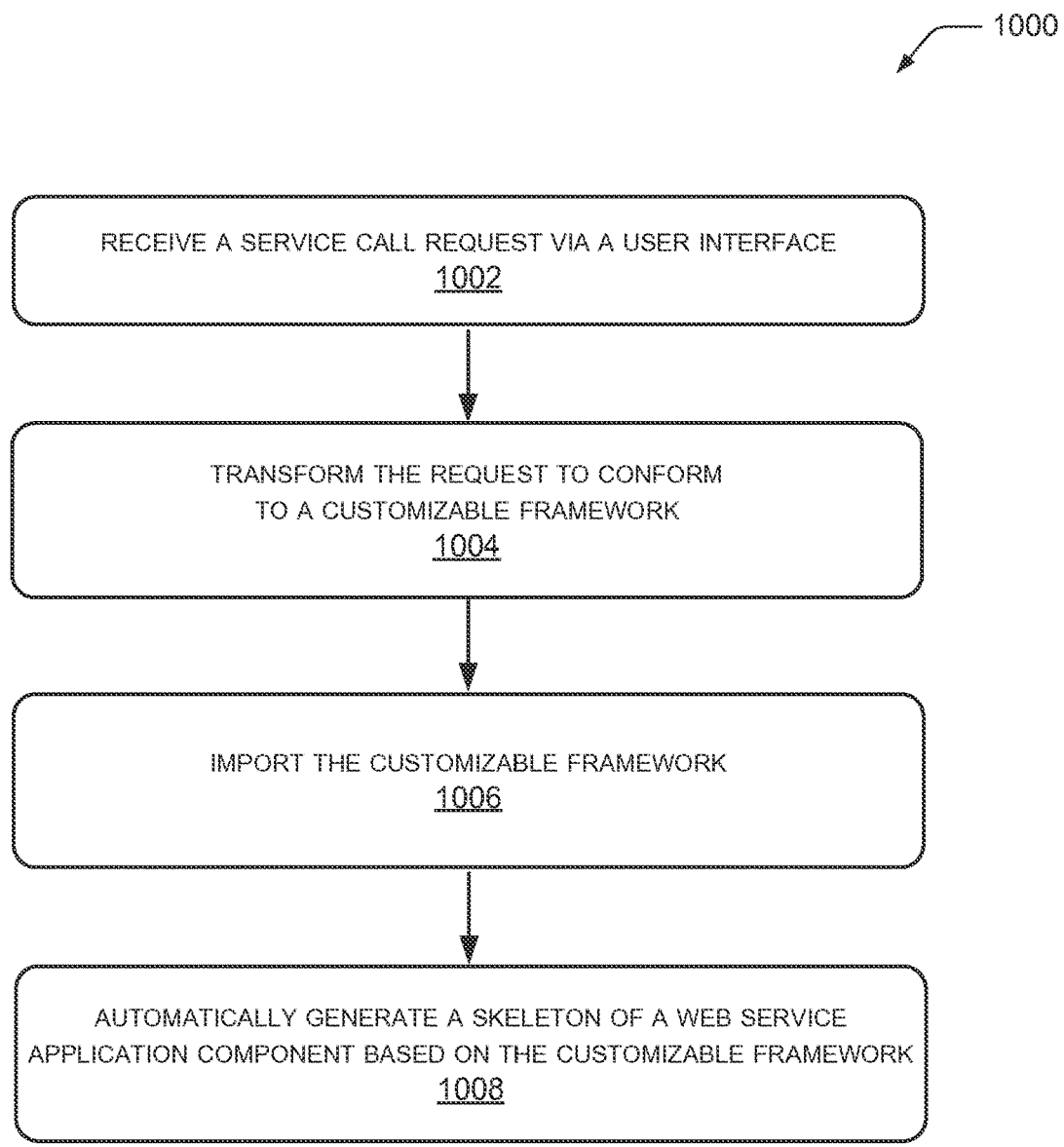
FIG. 10 is a flow diagram illustrating an example process for generating a skeleton of a web service application component.

FIG. 10 is a flow diagram illustrating an example process 1000 for generating a skeleton of a web service application component, according to an implementation. The process 1000 is described with reference to FIGS. 1-9.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented with any suitable components, or combinations thereof, without departing from the scope of the subject matter described herein.

At block 1002, the process includes receiving a service call request (such as request 202, for example) via a user interface (such as UI 110, for example). At block 1004, the process includes transforming the request to conform to a customizable framework (such as framework 204, for example). In an implementation, the process includes composing rewrite rules for rewriting the request, via the user interface.

At block 1006, the process includes importing the customizable framework. In an implementation, the process includes importing one or more additional frameworks arranged to interact with the customizable framework. In an implementation, the process includes modifying the customizable framework with user-customized validation and/or filtering components.

At block 1008, the process includes automatically generating a skeleton of a web service application component based on the customizable framework. In one example, the process includes automatically generating the skeleton of the web service application component via a scaffold service (such as scaffold service 208, for example). In an implementation, the process includes generating the scaffold service using the customizable framework.

In an implementation, the process includes automatically activating the skeleton of the web service application component in an in-memory database repository. In one example, the process includes automatically activating the skeleton of the web service application component via the scaffold service.

In an implementation, the process includes: receiving the request from a client, rewriting the request to a framework-compliant format, automatically parsing the rewritten request into request components, determining a request action from the request components, looking up the request action in one or more route tables, applying predefined and/or user-defined filters to the request action, de-serializing a payload of the request to an object, validating one or more fields of the object, invoking the request action, based on the object, when the object is valid, serializing a response object to a string, and sending the serialized response object to the client.

In an implementation, the process includes registering one or more method calls corresponding to potential request actions to the one or more route tables. In another implementation, the process includes throwing an exception when the request action is not present in the one or more route tables.

In an implementation, the process includes checking whether the request action of a user has required privileges for execution, via the filters.

In an implementation, the process includes implementing user-customized logic and/or a stored procedure with regard to the request action and the object to determine the response object. In another implementation, the process includes setting a content-type of the response object.

In one implementation, the process includes displaying a response output via a user interface of a display device. In an example, the process includes displaying a representation of the response object via the user interface.

In various implementations, one or more computer readable storage media (as described above) comprise computer executable instructions that, when executed by a computer processor, direct the computer processor to perform operations including at least a portion of the process 1000.

In alternate implementations, other techniques may be included in the process in various combinations, and remain within the scope of the disclosure.

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

What is claimed is:

1. Non-transitory computer-readable storage media, having computer-executable instructions stored thereon, that when executed, cause a computer processor to initiate:

receiving a service call request via a user interface, wherein the received service call request invokes an operation of an in-memory database repository;

transforming the request to conform to a customizable framework, wherein transforming the request comprises rewriting the request based on rewrite rules;

modifying the customizable framework with user-customized route tables;

importing the customizable framework;

automatically generating a skeleton of a web service application component via a scaffold service, based on the customizable framework;

automatically activating the skeleton of the web service application component in the in-memory database repository, wherein the activating comprises mapping a request action of the transformed request to the operation of the in-memory database repository using the user-customized route tables; and displaying a representation of a response object of the web service application component via the user interface, wherein the representation comprises a confirmation of the invoked operation.

2. The non-transitory computer-readable storage media of claim 1, wherein the invoked operation comprises inserting a purchasing transaction, updating database object, inserting a record of granting of a permission, authorization, license, inserting a record of merchandise ordering, inserting a record of a bill payment or inserting a record of a fund transferring.

3. A method, comprising:

receiving a service call request via a user interface, wherein the received service call request invokes an operation of an in-memory database repository;

transforming the request to conform to a customizable framework, wherein transforming the request comprises rewriting the request based on rewrite rules;

modifying the customizable framework with a user-defined route table;
importing the customizable framework;
automatically generating a skeleton of a web service application component based on the customizable framework;
automatically activating the skeleton of the web service application component in the in-memory database repository, wherein the activating comprises mapping a request action of the transformed request to the operation of the in-memory database repository using the user-defined route table; and
displaying a representation of a response object of the web service application component via the user interface, wherein the representation comprises a confirmation of the invoked operation.

4. The method of claim 3, further comprising automatically generating the skeleton of the web service application component via a scaffold service.

5. The method of claim 4, further comprising generating the scaffold service using the customizable framework.

6. The method of claim 3, further comprising importing one or more additional frameworks arranged to interact with the customizable framework.

7. The method of claim 3, further comprising modifying the customizable framework with user-customized validation and/or filtering components.

8. The method of claim 7, wherein the user-customized validation comprises a customized error message and/or a customized message key.

9. The method of claim 3, further comprising:
receiving the request from a client;
rewriting the request to a framework-compliant format;
automatically parsing the rewritten request into request components;
determining the request action from the request components;
looking up the request action in the user-defined route table;
applying predefined and/or user-defined filters to the request action;
de-serializing a payload of the request to an object;
validating one or more fields of the object;
invoking the request action, based on the object, when the object is valid;
serializing a response object to a string; and
sending the serialized response object to the client.

10. The method of claim 9, further comprising composing rewrite rules for rewriting the request, via the user interface.

11. The method of claim 9, further comprising registering one or more method calls corresponding to potential request actions to the user-defined route table.

12. The method of claim 9, further comprising throwing an exception when the request action is not present in the user-defined route table.

13. The method of claim 9, further comprising checking, via the filters, whether the request action of a user has required privileges for execution.

14. The method of claim 9, further comprising implementing user-customized logic and/or a stored procedure with regard to the request action and the object to determine the response object.

15. The method of claim 9, further comprising setting a content-type of the response object.

16. The method of claim 3, wherein the invoked operation comprises inserting a purchasing transaction, updating database object, inserting a record of granting of a permission, authorization, license, inserting a record of merchandise ordering, inserting a record of a bill payment or inserting a record of a fund transferring.

17. A system, comprising:
a user interface;
non-transitory computer-readable media storing processor-executable instructions and an in-memory database repository, and
a processor in communication with the computer-readable media, the processor being operative with the processor-executable instructions to perform operations, including:
receiving a service call request via the user interface, wherein the received service call request invokes an operation of the in-memory database repository,
transforming the request to conform to a customizable framework, wherein transforming the request comprises rewriting the request based on rewrite rules,
modifying the customizable framework with user-customized route tables,
automatically generating a skeleton of a web service application component based on the service call request and the customizable framework,
automatically activating the skeleton of the web service application component in the in-memory database repository, wherein the activating comprises mapping a request action of the transformed request to the operation of the in-memory database repository using the user-customized route tables, and
displaying a representation of a response object of the web service application component via the user interface, wherein the representation comprises a confirmation of the invoked operation.

18. The system of claim 17, wherein the framework supports different predetermined and/or user-defined method calls, validation methods, and filter rules.

19. The system of claim 17, wherein the web service application comprises a REST-based relational database type web service application.

20. The system of claim 17, wherein the invoked operation comprises inserting a purchasing transaction, updating database object, inserting a record of granting of a permission, authorization, license, inserting a record of merchandise ordering, inserting a record of a bill payment or inserting a record of a fund transferring.

* * * * *